United States Patent

Smyth et al.

(10) Patent No.: US 12,254,561 B2
(45) Date of Patent: Mar. 18, 2025

(54) PRODUCING A DIGITAL IMAGE REPRESENTATION OF A BODY

(71) Applicant: SPREEAI CORPORATION, Incline Village, NV (US)

(72) Inventors: Evan Smyth, La Crescenta, CA (US); Gil Spencer, Incline Village, NV (US)

(73) Assignee: SPREEAI CORPORATION, Incline Village, NV (US)

( * ) Notice: Subject to any disclaimer, the term of this patent is extended or adjusted under 35 U.S.C. 154(b) by 481 days.

(21) Appl. No.: 17/706,420

(22) Filed: Mar. 28, 2022

(65) Prior Publication Data

US 2022/0237857 A1   Jul. 28, 2022

Related U.S. Application Data

(63) Continuation-in-part of application No. 17/231,325, filed on Apr. 15, 2021, now Pat. No. 11,663,764.

(60) Provisional application No. 63/142,294, filed on Jan. 27, 2021.

(51) Int. Cl.
  *G06T 15/20*   (2011.01)
  *G06T 7/70*    (2017.01)
  *G06T 13/40*   (2011.01)

(52) U.S. Cl.
  CPC .......... *G06T 15/205* (2013.01); *G06T 7/70* (2017.01); *G06T 13/40* (2013.01); *G06T 2207/20084* (2013.01)

(58) Field of Classification Search
  None
  See application file for complete search history.

(56) References Cited

U.S. PATENT DOCUMENTS

| 6,466,215 B1 | 10/2002 | Matsuda et al. |
| 6,546,309 B1 | 4/2003  | Gazzuolo |
| 6,731,287 B1 | 5/2004  | Erdem |

(Continued)

FOREIGN PATENT DOCUMENTS

| CN | 110930500 A   | 3/2020  |
| WO | 2014161429 A1 | 10/2014 |

(Continued)

OTHER PUBLICATIONS

Kim et al., "Deep Video Portraits", ACM Trans. Graph, vol. 37, No. 4, Article 163; published online May 29, 2018, pp. 163:1-14; Association for Computing Machinery, U.S.A. https://arxiv.org/pdf/1805.11714.pdf.

(Continued)

*Primary Examiner* — Daniel F Hajnik
*Assistant Examiner* — Jed-Justin Imperial
(74) *Attorney, Agent, or Firm* — FIG. 1 Patents

(57) ABSTRACT

Methods and apparati for using an avatar (2) to help produce a digital image representation (17) of a body (1). A method embodiment of the present invention comprises the steps of capturing (21) measurements of the body (1) and combining the measurements with an avatar (2) to produce a set of avatar images (11); invoking (22) a neural network (3) to generate a set of photorealistic face and hair images (12); combining (26) the avatar images (11) and the face and hair images (12) to produce a set of composite images (16); and converting (27) the set of composite images (16) into a set of final images (17) representing the body (1).

20 Claims, 7 Drawing Sheets

(56) References Cited

U.S. PATENT DOCUMENTS

| | | | |
|---|---|---|---|
| 10,255,681 | B2 | 4/2019 | Price et al. |
| 10,936,853 | B1* | 3/2021 | Sethi .................... G06V 40/162 |
| 2007/0091085 | A1 | 4/2007 | Wang et al. |
| 2007/0188502 | A1 | 8/2007 | Bishop |
| 2009/0066700 | A1 | 3/2009 | Harding et al. |
| 2013/0100140 | A1 | 4/2013 | Ye et al. |
| 2013/0314412 | A1 | 11/2013 | Gravois et al. |
| 2016/0086500 | A1* | 3/2016 | Kaleal, III ............... A61B 5/43 434/257 |
| 2016/0163084 | A1 | 6/2016 | Corazza et al. |
| 2016/0247017 | A1 | 8/2016 | Sareen et al. |
| 2016/0284018 | A1 | 9/2016 | Adeyoola et al. |
| 2017/0004657 | A1 | 1/2017 | Zagel et al. |
| 2017/0080346 | A1 | 3/2017 | Abbas |
| 2018/0047200 | A1 | 2/2018 | O'Hara et al. |
| 2018/0197347 | A1 | 7/2018 | Tomizuka |
| 2018/0240280 | A1 | 8/2018 | Chen et al. |
| 2018/0240281 | A1 | 8/2018 | Vincelette |
| 2019/0035149 | A1* | 1/2019 | Chen .................... G06V 40/166 |
| 2019/0156541 | A1 | 5/2019 | Isgar |
| 2019/0265945 | A1* | 8/2019 | Newell .................. G06Q 30/02 |
| 2019/0287301 | A1 | 9/2019 | Colbert |
| 2019/0371032 | A1 | 12/2019 | Scapel et al. |
| 2020/0066029 | A1* | 2/2020 | Chen .................... G06T 15/205 |
| 2020/0126316 | A1 | 4/2020 | Sharma et al. |
| 2020/0234508 | A1 | 7/2020 | Shaburov et al. |
| 2020/0258280 | A1 | 8/2020 | Park et al. |
| 2020/0294294 | A1 | 9/2020 | Petriv et al. |
| 2020/0306640 | A1 | 10/2020 | Kolen et al. |
| 2020/0320769 | A1 | 10/2020 | Chen et al. |
| 2020/0334867 | A1 | 10/2020 | Chen et al. |
| 2020/0346420 | A1 | 11/2020 | Friedrich |
| 2020/0364533 | A1 | 11/2020 | Sareen et al. |
| 2020/0402307 | A1 | 12/2020 | Tanwer et al. |
| 2021/0049811 | A1 | 2/2021 | Fedyukov et al. |
| 2021/0074005 | A1* | 3/2021 | Xie ........................ G06T 11/60 |
| 2021/0150187 | A1 | 5/2021 | Karras et al. |
| 2021/0303919 | A1 | 9/2021 | Niu |
| 2021/0398337 | A1* | 12/2021 | McDuff .................. G06T 13/40 |
| 2022/0122344 | A1* | 4/2022 | Liu ........................ G06V 10/751 |

FOREIGN PATENT DOCUMENTS

| | | |
|---|---|---|
| WO | 2017029488 A2 | 2/2017 |
| WO | 2017143392 A1 | 8/2017 |
| WO | 2018089039 A1 | 5/2018 |
| WO | 2018154331 A1 | 8/2018 |
| WO | 2019050808 A1 | 3/2019 |
| WO | 2019164266 A1 | 8/2019 |
| WO | 2020038254 A1 | 2/2020 |

OTHER PUBLICATIONS

Lewis et al., "Pose Space Deformation: A Unified Approach to Shape Interpolation and Skeleton-Driven Deformation", SIGGRAPH 2000, New Orleans, Louisiana, USA, pp. 165-172.

Neophytou et al., "Shape and Pose Space Deformation for Subject Specific Animation", Centre for Vision Speech and Signal Processing (CVSSP), University of Surrey, Guildford, United Kingdom; IEEE Conference Publication, IEEE Xplore, 2013, 8 pages.

"Pose space deformation," article in Wikipedia, downloaded Jul. 29, 2022, 2 pages.

Burkov, "Neural Head Reenactment with Latent Pose Descriptors", Procedings of the IEEE/CVF Conference on Computer Vision and Pattern Recognition (CVPR) 2020, pp. 13766-13795; Oct. 30, 2020. https://arxiv.org/pdf/2004.12000.

Deng, "Disentangled and Controllable Face Image Generation via 3D Imitative-Contrastive Learning", Computer Vision Foundation Conference, Proceedings of the IEEE/CVF Conference on Computer Vision and Pattern Recognition (CVPR) 2020, pp. 5154-5163; open access version. https://arxiv.org/abs/1904.01909.

Tripathy, "ICface: Interpretable and Controllable Face Reenactment Using GANs", Proceedings of the IEEE/CVF Winter Conference on Applications of Computer Vision (WACV) 2020, pp. 3385-3394; Jan. 17, 2020. https://arxiv.org/abs/1904.01909.

Huang, "Learning Identity-Invariant Motion Representations for Cross-ID Face Reenactment", Procedings of the IEEE/CVF Conference on Computer Vision and Pattern Recognition (CVPR) 2020, pp. 7084-7092, 2020, open access version, https://openaccess.thecvf.com/content_CVPR_2020/html/Huang_Learning_Identity-Invariant_Motion_Representations_for_Cross-ID_Face_Reenactment_CVPR_2020_paper.html.

Thies, "Face2Face: Real-Time Face Capture and Reenactment of RGB Videos", Jul. 29, 2020; abstract of this paper published in 2016 by IEEE at https://ieeexplore.ieee.org/document/7780631.

Zhao, "Joint face alignment and segmentation via deep multi-task learning", published in Multimedia Tools and Applications 78, 13131-13148 (2019), published by Springer Nature, 1 New York Plaza, Suite 4600, New York, NY 10004-1562, U.S.A., Jan. 12, 2018 https://doi.org/10.1007/s11042-018-5609-1.

Li, "FaceShifter: Towards High Fidelity and Occlusion Aware Face Swapping", Peking University and Microsoft Research, Sep. 15, 2020. lililngzhi@pku.edu.cn and jianbao.haya.doch.fangwen@microsoft.com; pdf version available at: https://arxiv.org/pdf/1912.13457.pdf.

Nirkin, "FSGAN: Subject Agnostic Face Swapping and Reenactment", Computer Vision Foundation, ICCV 2019, open access version, Aug. 2019, https://arxiv.org/pdf/1908.05932.pdf ; also published in Proceedings of the IEEE International Conference on Computer Vision, pp. 7184-7193 and on Yuval Nirkin's website: https://nirkin.com/fsgan/.

Naruniec, "High-Resolution Neural Face Swapping for Visual Effects", Eurographics Symposium on Rendering 2020, vol. 39 (2020), No. 4. https://studios.disneyresearch.com/wp-content/uploads/2020/06/High-Resolution-Neural-Face-Swapping-for-Visual-Effects.pdf; also published by the Eurographics Association, c/o Fiduciare A. Richard SA, Avenue de Frontenex 32, 1207 Geneva, Switzerland, IDE CHE-100.558.3722020 https://diglib.eg.org/andle/10.2312/2632924.

Wawrzonowski et al. "Mobile devices' GPUs in cloth dynamics simulation", Proceedings of the Federated Conference on Computer Science and Information Systems, Prague, Czech Republic, 2017, pp. 1283-1290. Retrieved on Feb. 23, 2022. Retrieved from UKL: https://annals-csis.orgVolume_11/drp/pdf/191.pdf.

International Preliminary Report on Patentability (issued by the USPTO/RO as the designated IPEA, after the filing of an Article 34 Amendment) mailed Oct. 11, 2023 for PCT/US2022/022180 with an international filing date of Mar. 28, 2022; 12 pages.

Goes, F. et al., "Garment Refitting for Digital Characters", SIGGRAPH '20 Talks, Aug. 17, 2020, Virtual Event, USA; 2 pages. ACM ISBN 978-1-4503-7971-7/20/08. https://doi.org/10.1145/3388767.3407348.

22788638.9 , "EP Search Report", EP Application No. 22788638.9, Dec. 13, 2024, 7 pages.

* cited by examiner

PRODUCING A DIGITAL IMAGE REPRESENTATION OF A BODY

RELATED APPLICATIONS

The present application is a continuation-in-part of commonly owned U.S. patent application Ser. No. 17/231,325 filed Apr. 15, 2021, entitled "Automatic Creation of a Photorealistic Customized Animated Garmented Avatar", which claims the priority benefit of U.S. provisional patent application 63/142,294 filed on Jan. 27, 2021, entitled "Automatic Creation of a Photorealistic Customized Animated Garmented Avatar for a Person"; both of said previous patent applications are hereby incorporated in their entireties into the present patent application.

TECHNICAL FIELD

The present invention pertains to the field of using a digitized avatar and measurements of a user to produce a photorealistic digital image representation of the user, e.g., a human that may be adorned in garments, shoes, accessories, jewelry, hats, eyeglasses, sunglasses, belts, purses, handbags, backpacks, etc.

BACKGROUND ART

Previous attempts to integrate avatars with digitized representations of users have too often been clumsy, and have introduced unwanted artifacts into the final composite image. The present invention solves many of the problems associated with the prior art.

DISCLOSURE OF INVENTION

Methods and apparati for using an avatar (2) to help produce a digital image representation (17) of a body (1). A method embodiment of the present invention comprises the steps of capturing (21) measurements of the body (1) and combining the measurements (1) with an avatar (2) to produce a set of avatar images (11); invoking (22) a neural network (3) to generate a set of photorealistic face and hair images (12); combining (26) the avatar images (11) and the face and hair images (12) to produce a set of composite images (16); and converting (27) the set of composite images (16) into a set of final images (17) representing the body (1).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF PREFERRED EMBODIMENTS

Figure 1:
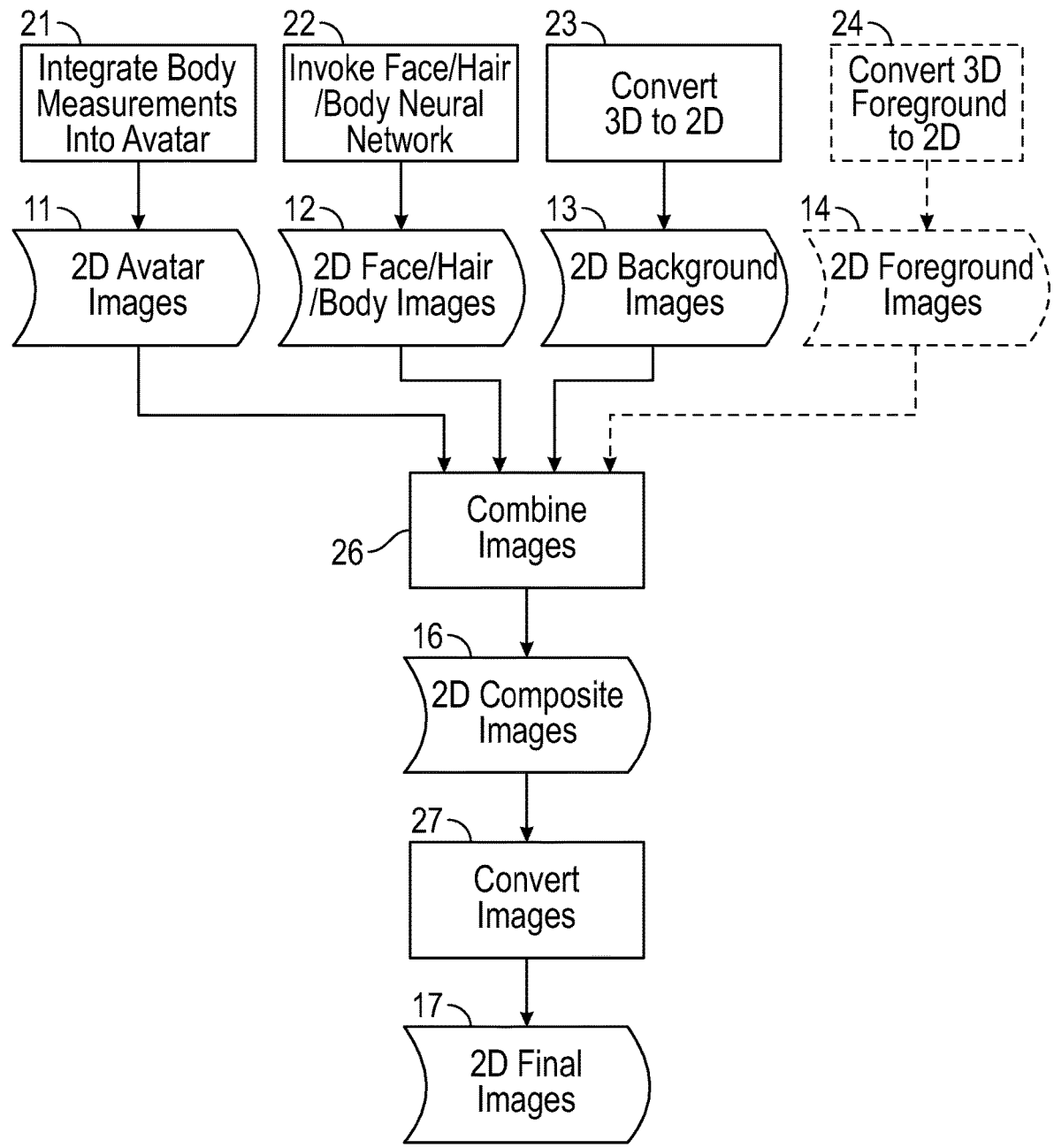
FIG. 1 is a flowchart diagram illustrating the overall method of the present invention.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The invention described herein enables a user 40, normally a human user, to integrate his or her body measurements 1, and detailed hair and face features, with one of a pre-existing set of avatars 2 maintained by the administrator of the system. In alternative embodiments, every frame of the avatar 2 is resized and every frame of the user's garments is resized, based upon the dimensions of the garments.

The administrator may be an employee or agent of a company that sells clothing and maintains a Website where the user 40 can interface with the system. The elements of the system that are managed by the administrator are maintained on one or more computers under the control of the administrator. In integrating the user body measurements 1, including details of the user's face and hair, with the digitized avatar 2, the user 40 can visually see how the company's clothing would look on the user 40. The end product 17 of this invention, which is normally a video but can also be a set of still images, can be sold or licensed. Also, this invention can advantageously help the company sell its line of clothing to the user 40 and to other users not depicted herein.

As will be seen from the following description, the inputs to the inventive system are usually two-dimensional (2D) images or 2D images derived from 3D scenes, but the inputs may be 3D images. These input images are normally videos, such as scans of the user's face and hair, but may be one or more still images, such as 2D photos capturing the user's measurements 1. Similarly, the final output product of the system is usually a set of two-dimensional (2D) images 17, but they may be 3D images 17. Images 17 normally comprise a video having multiple frames, but in certain embodiments, images 17 can simply be one or more still images.

As used in the following description, user 40 is deemed to be a female, but of course user 40 can also be a male.

Figure 4:
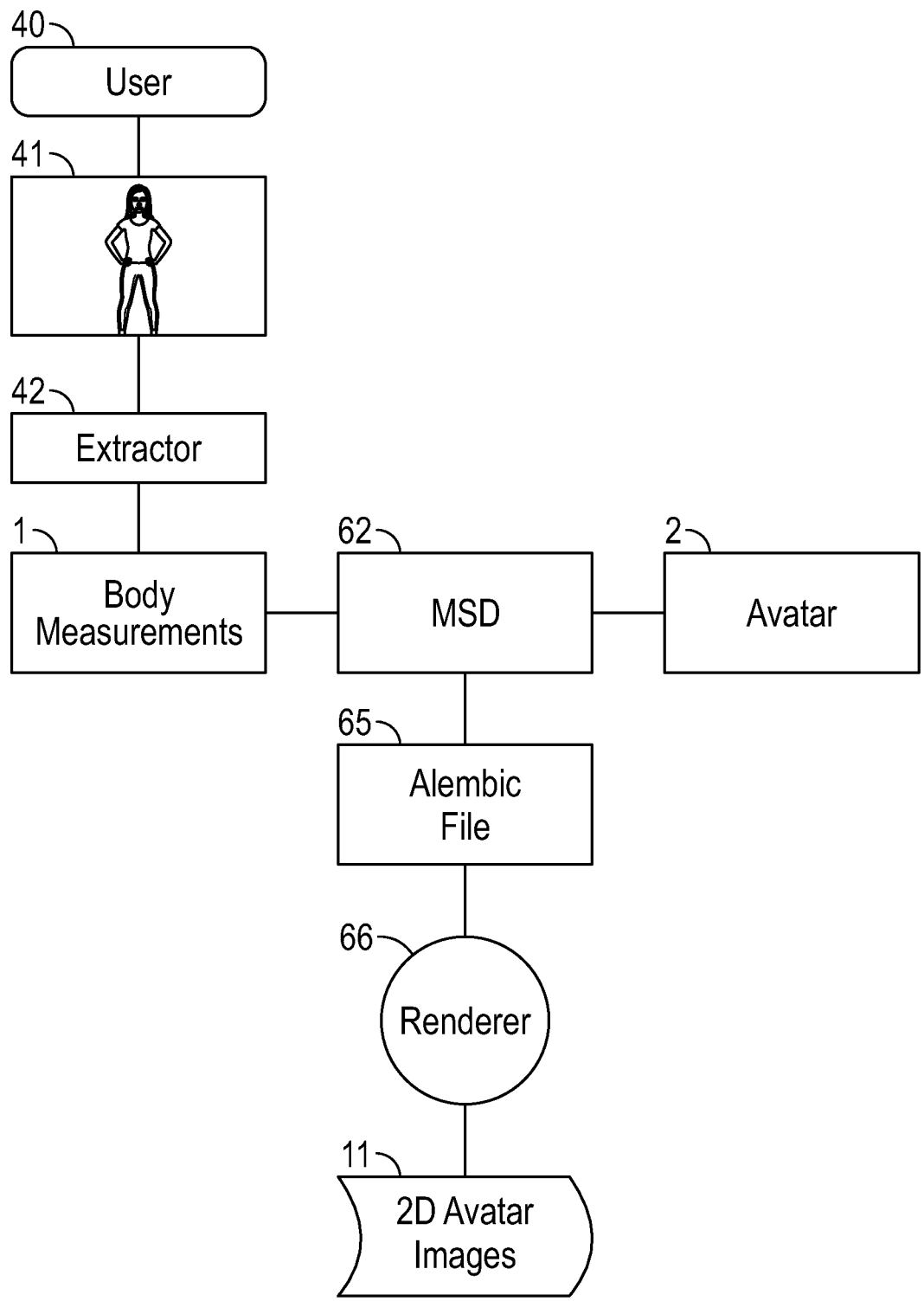
FIG. 4 is a block diagram illustrating the conversion of user 40 body measurements 1 into the set of avatar images 11 that are shown in FIGS. 1 and 2.

As shown in FIG. 4, user 40 takes a selfie 41 of herself using a cell phone or other camera, or otherwise inserts a photo 41 of herself into her cell phone or as an input to the Website maintained by the administrator. Photo 41 is converted by a conventional photo analyzing extractor 42 into a set of body measurements 1 of user 40. The set of body measurements 1 may include a digitized representation of the user's face, hair, body, garments, shoes, accessories, jewelry, hats, eyeglasses, sunglasses, belts, purses, handbags, backpacks, etc. Extractor 42 does not have to be a neural network, but it can be a neural network. Alternatively to capturing measurements 1 by photographic means, the measurements 1 can be manually input to MSD (Measurement Space Deformation) module 62. This alternative embodiment is not illustrated in FIG. 4. Six measurements 1 give excellent results, with the most relevant measurements 1 normally being height, bra size, and dress size.

Independently of this user 40 input, a pre-existing avatar catalog 61 managed by the administrator of the system is accessed to select an avatar 2 that is suitable for use by user 40. The particular avatar 2 may be selected by the user 40 or suggested by the administrator. The set of avatars 61 is more fully described in U.S. priority patent application Ser. No. 17/231,325 filed Apr. 15, 2021. The avatar images 2 may include at least one of garments, shoes, accessories, jewelry, hats, eyeglasses, sunglasses, belts, purses, handbags, and backpacks. The digitized avatar 2 may be a video representing successive positions of an avatar head during the playing of the avatar video. The avatar video 2 may represent a sequence representing desired hair motion during the playing of the final video 17. The avatar 2 can be portrayed in any situation at all. For example, the avatar 2 may be in a vehicle such as a car, at a public event such as a basketball game, etc. The body measurements 1 and the selected avatar 2 are combined by MSD module 62 into alembic file 65 at method step 21 (see FIG. 1). Alembic file 65 includes representations of garments appropriate for the user's size and measurements. MSD module 62 is not a neural network, but a neural network can be used in lieu of MSD module 62 in certain embodiments.

Figure 2:
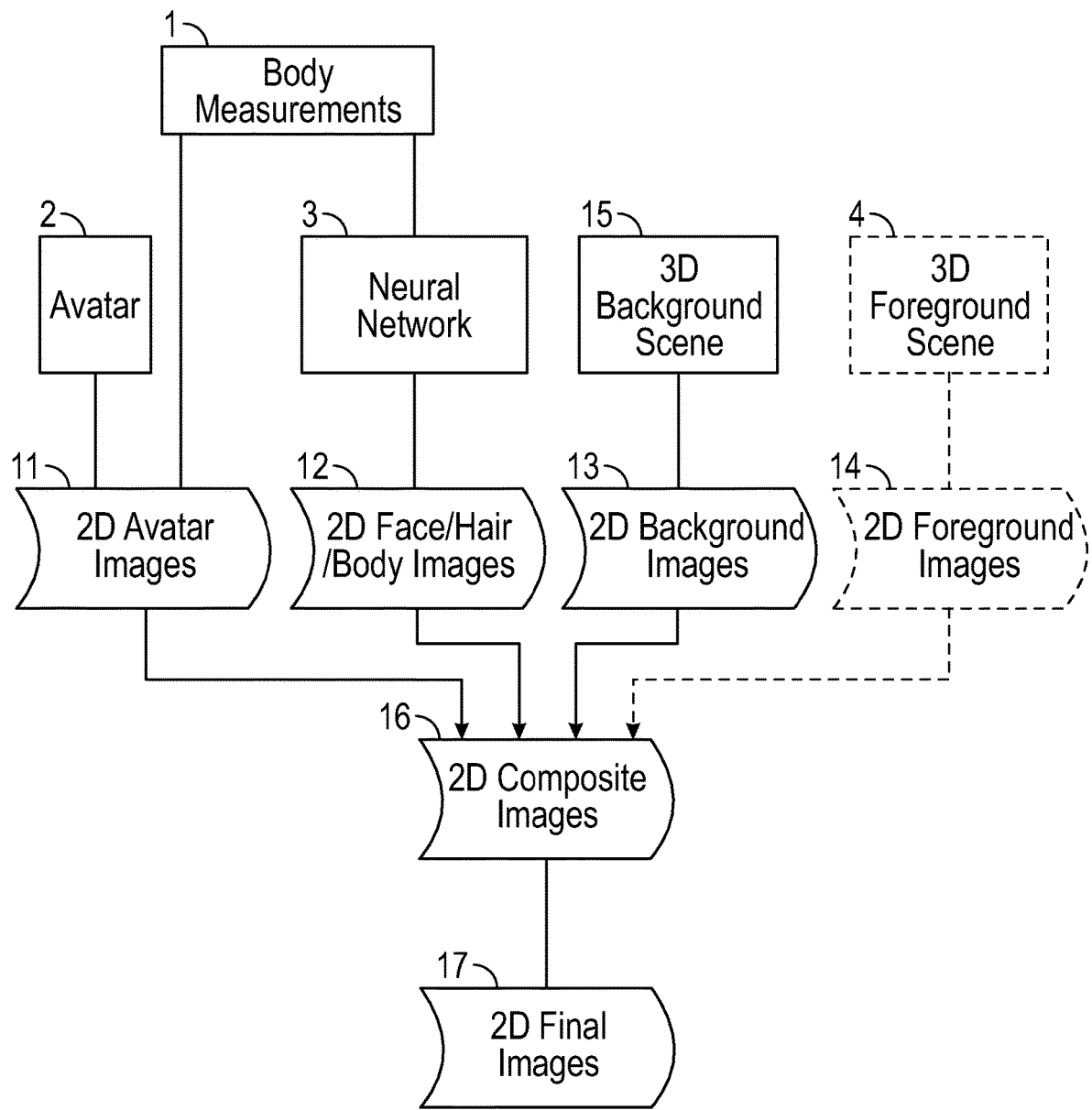
FIG. 2 is a block diagram corresponding to the FIG. 1 embodiment.

All of files 1, 2, and 65 can be three-dimensional (3D). When alembic file 65 is 3D, it is usually converted into two dimensions by renderer 66 to produce a set of two-dimensional avatar images 11 as shown in FIGS. 1 and 2. In some embodiments, renderer 66 outputs avatar images 11 having all three of the input dimensions. Renderer 66 can be a neural network, but is typically not a neural network. Rather, renderer 66 is typically an off-the-shelf game engine as commonly used by the video game industry, such as an Epic Games Unreal engine. The fact that items 42, 62, and 66 don't have to be neural networks is desirable, because neural networks have to be trained before being used, making them resource-intensive.

Avatar 2 is typically a brief (e.g., 15 second) video showing an individual in some action sequence (e.g., a ballerina on a dance floor, or a passenger on a yacht) that user 40 wishes to emulate as she pictures herself in clothing sold by the company, third party clothing (e.g., clothing of an influencer or name brand clothing), or fantasy clothing that is not being sold by anyone. The user 40 can select the video 2 from a pre-established catalog 61 of videos that are computer generated, real life videos, or a combination of computer generated and real life videos 2. The invention thus enables users 40 to see themselves in scenes of their choice and to visualize their dreams.

Figure 5:
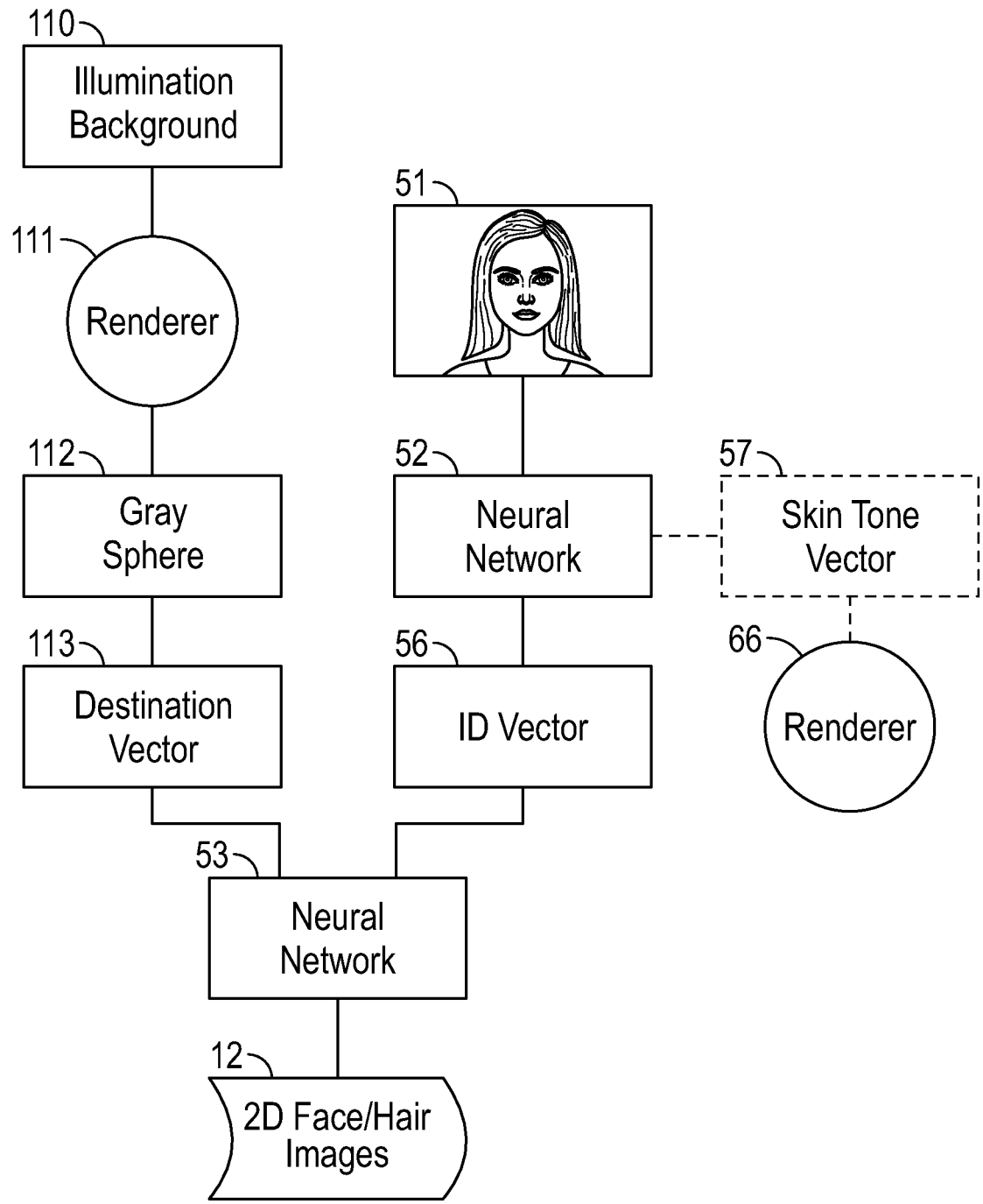
FIG. 5 is a block diagram illustrating the conversion of face/hair measurements 51 into the set of face/hair images 12 that are shown in FIGS. 1 and 2.

With reference to FIG. 5, as part of selfie 41 or, preferably, as a different photo 51, user 40 takes a selfie 51 of just her face and hair, or otherwise enters a detailed photo 51 of her face and hair into the Website of the company, or into her cell phone based mobile software application. The face and hair images 51 may include at least one of jewelry, hats, eyeglasses, and sunglasses. Photo 51 is processed by a neural network 52 to produce an identity vector 56. Neural network 52 may be, for example, similar or identical to neural network 4, 34, 304, or 404 described in commonly owned U.S. patent application Ser. No. 17/559,437 filed Dec. 22, 2021, which patent application is hereby incorporated by reference in its entirety into the present patent application.

Identity vector 56 is then preferably combined with a destination vector 113 representing the illumination of the user's face and hair. This combination is performed by neural network 53 at step 22 (see FIG. 1) to produce the set of two-dimensional face and hair images 12 shown in FIGS. 1 and 2. In those embodiments where the user's face and hair is processed as part of the user's overall body 41, the set of images 12 includes two-dimensional representations of the entirety of the user's body 11, including any garments, shoes, accessories, jewelry, hats, eyeglasses, sunglasses, belts, purses, handbags, backpacks, etc., and not just the user's face and hair 51.

In some embodiments of the present invention, the functions of neural networks 52 and 53 can be performed by a single neural network.

Destination vector 113 is typically produced by starting with an image showing the desired illumination 110 that will appear in the final set of images 17. This starting point 110 may be similar or identical to driver illumination sphere 412 described in the aforesaid U.S. patent application Ser. No. 17/559,437 filed Dec. 22, 2021. Illumination sphere 110 may include a representation of an image sequence and matte representing a boundary between head and neck, thereby facilitating accurate blending of image 11-14 inputs in the final converting step 27. This desired illumination background 110 is usually processed by an illumination renderer 111, such as an instance of the aforesaid Unreal engine, which produces a gray sphere 112 as an intermediate step prior to the formation of the destination vector 113. The percentage of gray in gray sphere 112 is typically around 18%, but other percentages of gray can be used as desired. Vector 113 is now in the proper format to serve as an input to neural network 53.

In certain embodiments, the skin tone of the user's face is separately extracted by neural network 52 to form a skin tone vector 57, which is fed as an additional input to previously described renderer 66. This technique gives a more realistic portrayal of the user's skin tone when the set of avatar images 11 is produced.

Figure 6:
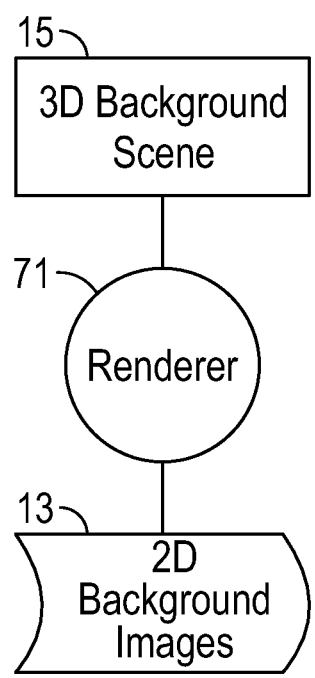
FIG. 6 is a block diagram showing the conversion of background scene 15 into the set of background images 13 that are shown in FIGS. 1 and 2.

It is normally but not always desirable to have a set of background images 13 (such as a background video) as part of the set of final images 17 produced by the present invention. In these embodiments, it is preferable to separately pre-process a 3D background scene 15. As shown in FIG. 6, the background scene 15 is usually processed by renderer 71, such as an instance of the previously described Unreal engine, to produce the set of two-dimensional background images 13 that is shown in FIGS. 1 and 2.

Figure 7:
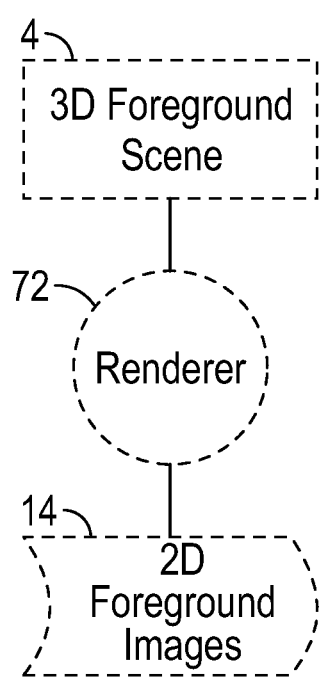
FIG. 7 is a block diagram showing the conversion of foreground scene 4 into the set of foreground images 14 that are shown in FIGS. 1 and 2.

In some embodiments, there is an optional three-dimensional foreground scene 4 that can also be integrated into the final product 17. The foreground scene 4 represents images that will appear, in the final product 17, to be in front of the avatar images 11. In these embodiments, and as shown in FIG. 7, the three-dimensional foreground scene 4 is usually processed by renderer 72, such as an instance of the previously described Unreal engine, which produces the set of two-dimensional foreground images 14 that is shown in FIGS. 1 and 2.

At method step 26 (see FIG. 1), the avatar images 11, face/hair/body images 12, optional background images 13, and optional foreground images 14 are combined to form a set of two-dimensional or three-dimensional composite images 16. These images 16, which will ultimately become the set of final output images 17, can be edited during step 26. For example, the several images 11-14 can be combined using fade-outs, fade-ins, or other known cinematographic techniques. Step 26 advantageously does not require the use of a neural network, but a neural network can be fruitfully employed in some embodiments. During step 26, the sets of images 11-14 are made to have the same size and resolution as each other, and are aligned with each other.

Finally, in step 27, the composite images 16 undergo final processing to produce the end product: the set of final two-dimensional images 17. Images 17 may be one or more still images, but are normally an output video comprising a plurality of frames. During this final conversion step 27, an audio track and/or special effects can be added to the video, and the frames can be tailored to the particular computer to be employed by user 40. The tailoring can be accomplished by, for example, cropping frames of the video 17, and/or by adjusting the resolution to accommodate the user's computer monitor.

Figure 3:
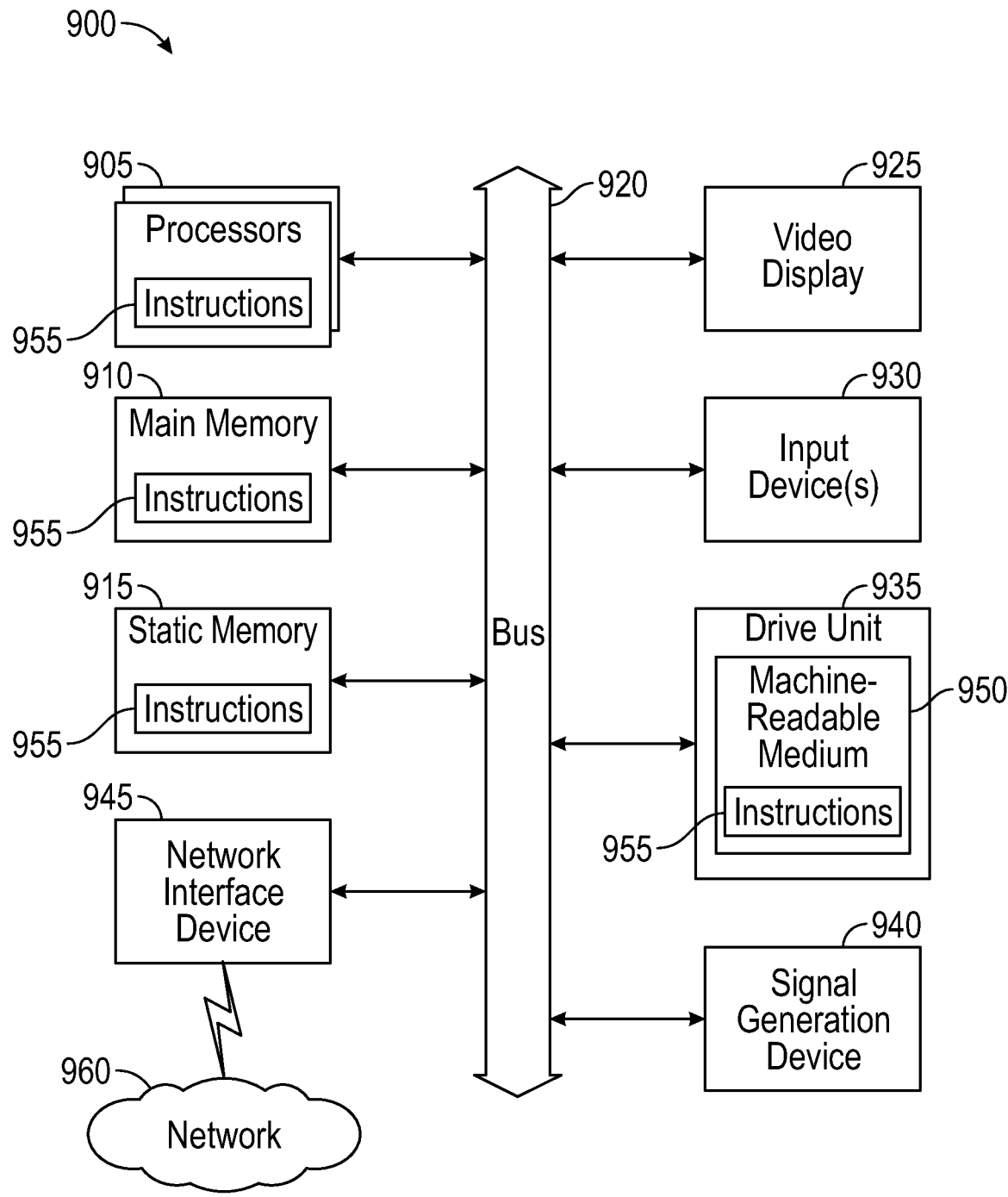
FIG. 3 is a diagrammatic representation of a typical computer that is capable of executing the method steps of the present invention.

FIG. 3 shows a diagrammatic representation of a computing device or a machine in, for example, the electronic form of a computer system 900, within which a set of instructions for causing the machine to perform any one or more of the methods discussed herein can be executed. In some embodiments, the machine operates as a standalone device, while in other embodiments it can be connected (e.g., networked) to other machines. In a networked deployment, the machine can operate in the capacity of a server, a client machine in a server-client network environment, or as a peer machine in a peer-to-peer (or distributed) network environment. The machine can be or comprise a personal computer (PC), tablet PC, cellular telephone, web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methods discussed herein.

In an illustrative embodiment, the computer system 900 comprises at least one processor 905 (e.g., a central processing unit, a GPU, and so on, singly or in combination), and a memory, which in this example comprises a main memory 910 and a static memory 915. The computer system 900 may further comprise a video display 925, a signal generation device 940 (e.g., a speaker), and a network interface device 945. In addition, the computer system 900 may comprise at least one input device 930, such as an alphanumeric input device (e.g., a keyboard), a cursor control device (e.g., a mouse), a microphone, a digital camera, and so forth. Communication among the components may be accomplished via a bus 920. Computer system 900 can be implemented in a variety of ways—for example, a speech processing system can be used to input the user's dimensions; and a holographic display, HD television monitor, or billboard display can be used in lieu of or in addition to video display unit 925.

A drive unit 935 includes a computer-readable medium 950, which stores one or more sets of instructions 955 and data embodying or utilized by any one or more of the methods or functions described herein. The instructions 955 can also reside, completely or at least partially, within the main memory 910 and/or within the processors 905 during execution thereof by the computer system 900. The main memory 910 and the processors 905 also constitute machine-readable media. All the modules of the present invention can be embodied in an embedded system in an FPGA or SOC (system on a chip), with everything embedded in a single processor.

The instructions 955 can further be transmitted or received over a communications network 960 via the network interface device 945 utilizing any one of a number of well-known transfer protocols (e.g., Hyper Text Transfer Protocol (HTTP), Controller Area Network, Serial, and Modbus). The communications network 960 may include the Internet, local intranet, PAN, LAN, WAN, Metropolitan Area Network, VPN, a cellular network, Bluetooth radio, or an IEEE 802.9-based radio frequency network, and the like.

While the computer-readable medium 950 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methods of the present application, or that is capable of storing, encoding, or carrying data utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory, read only memory, and the like.

The example embodiments described herein can be implemented in an operating environment comprising computer-executable instructions installed on a computer, in software, in hardware, or in a combination of software and hardware. The computer can be a mobile (cell) phone. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written utilizing any number of suitable programming languages such as, for example, HyperText Markup Language (HTML), Dynamic HTML, Extensible Markup Language, Extensible Stylesheet Language, Document Style Semantics and Specification Language, Cascading Style Sheets, Synchronized Multimedia Integration Language, Wireless Markup Language, Java™ Jini™, C, C++, C#, Go, .NET, Adobe Flash, Perl, UNIX Shell, Visual Basic or Visual Basic Script, Virtual Reality Markup Language, ColdFusion™ Objective-C, Scala, Clojure, Python, JavaScript, HTML5 or other compilers, assemblers, interpreters, or other computer languages or platforms, as one of ordinary skill in the art will recognize.

The above description is included to illustrate the operation of preferred embodiments, and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for using an avatar to produce a digital image representation of a body of a user, said method comprising the steps of:
capturing, from one or more input images of the body from a video, measurements of the body and combining the measurements with an avatar to produce a set of avatar images;
invoking a neural network to generate a set of photorealistic face and hair images of the user;
combining the avatar images and the face and hair images to produce a set of composite images; and
converting the set of composite images into a set of final images representing the body by inputting, by the neural network, data describing an image sequence and matte representing a boundary between a head and a neck to facilitate accurate blending of image inputs.

2. The method of claim 1 wherein each image is a single still frame.

3. The method of claim 1 wherein the combining step further combines foreground images in addition to combining the avatar images and the face and hair images.

4. The method of claim 1 wherein the user is a human person.

5. The method of claim 4 wherein the digital image representation is a representation of the person's face, hair, body, garments, and shoes.

6. The method of claim 1 wherein the avatar images comprise at least one of garments and shoes.

7. The method of claim 1 wherein the step of invoking a neural network takes into account skin tone of the user, as well as illumination of the user's face and hair.

8. The method of claim 1 wherein the neural network inputs data describing an image sequence representing successive positions of an avatar head during playing of an avatar video.

9. The method of claim 1 wherein the neural network inputs data describing a sequence representing desired hair motion during playing of an avatar video.

10. The method of claim 1 wherein the neural network inputs data describing an image sequence representing illumination on a head area during playing of an avatar video.

11. The method of claim 1 wherein inputs to the neural network comprise a set of face and hair images.

12. The method of claim 1 wherein the neural network produces, in addition to face and hair images, an entire representation of the body, including the head of the body.

13. The method of claim 12 wherein the neural network produces measurements of the body.

14. Apparatus for producing a digital image representation of a body, said apparatus comprising one or more processors configured to:
capture, from one or more input images of the body from a video, measurements of the body and combine the measurements with an avatar to produce a set of avatar images;
generate, using a neural network, a set of photorealistic face and hair images;
combine the avatar images and the face and hair images to produce a set of composite images; and
convert the set of composite images into a set of final images representing the body by inputting, by the neural network, data describing an image sequence and matte representing a boundary between a head and a neck to facilitate accurate blending of image inputs.

15. The apparatus of claim 14, wherein the one or more processors are further configured to convert a background scene into a set of background images and combine the set of background images along with the avatar images and the face and hair images.

16. The apparatus of claim 14 wherein the one or more processors are further configured to combine at least one of garments, shoes, accessories, background, jewelry, hats, eyeglasses, sunglasses, belts, purses, handbags, and backpacks associated with the body.

17. The apparatus of claim 14 wherein the one or more processors are further configured to add an audio track to the set of composite images.

18. One or more non-transitory computer-readable storage media storing instructions that, responsive to execution by a processing device, causes the processing device to:
capture, from one or more input images of the body from a video, measurements of the body and combine the measurements with an avatar to produce a set of avatar images;
invoke a neural network to generate a set of photorealistic face and hair images of the user;
combine the avatar images and the face and hair images to produce a set of composite images; and
convert the set of composite images into a set of final images representing the body by inputting, by the neural network, data describing an image sequence and matte representing a boundary between a head and a neck to facilitate accurate blending of image inputs.

19. The one or more non-transitory computer-readable storage media of claim 18, wherein the instructions, responsive to execution by the processing device, further cause the processing device to convert a background scene into a set of background images and combine the set of background images along with the avatar images and the face and hair images.

20. The one or more non-transitory computer-readable storage media of claim 18, wherein the instructions, responsive to execution by the processing device, further cause the processing device to combine at least one of garments, shoes, accessories, background, jewelry, hats, eyeglasses, sunglasses, belts, purses, handbags, and backpacks associated with the body.

* * * * *